United States Patent [19]

Alt et al.

[11] Patent Number: 5,091,624

[45] Date of Patent: Feb. 25, 1992

[54] METHOD OF FLASH BUTT WELDING HIGH-CARBON MATERIAL, IN PARTICULAR NODULAR CAST IRON

[75] Inventors: Anton Alt, Schaffhausen; Peter Toelke, Diessenhofen, both of Switzerland; Ludwig Wilhelm, Engen; Urban Zimmermann, Klettgau, both of Fed. Rep. of Germany

[73] Assignee: Georg Fischer AG, Schaffhausen, Switzerland

[21] Appl. No.: 411,723

[22] Filed: Sep. 25, 1989

[30] Foreign Application Priority Data

Sep. 23, 1988 [CH] Switzerland .................... 03553/88

[51] Int. Cl.$^5$ ............................................. B23K 11/04
[52] U.S. Cl. ...................................................... 219/100
[58] Field of Search ................................. 219/97, 100

[56] References Cited

U.S. PATENT DOCUMENTS

| | | | |
|---|---|---|---|
| 2,066,647 | 1/1937 | Rodman | 219/100 |
| 2,085,583 | 6/1937 | Hanson | 219/100 |
| 2,459,795 | 1/1949 | Dawson | 219/100 |
| 4,319,117 | 3/1982 | Kuchuk-Yatsenko et al. | 219/100 |
| 4,645,896 | 2/1987 | Baba et al. | 219/100 |
| 4,733,044 | 3/1988 | Kuchuk-Yatsenko et al. | 219/100 |

*Primary Examiner*—Clifford C. Shaw
*Attorney, Agent, or Firm*—Bachman & LaPointe

[57] ABSTRACT

A method of flash butt welding high-carbon materials, in particular nodular cast iron wherein the arcing craters produced by intermitting contact of the contact faces have a maximum roughness depth $R_T$ such that this roughness depth lies within the narrowest thickness of the plasticized zone. As a result, when the upsetting pressure is applied, the entire molten material areas on the contact faces are pressed out of the contact faces into the welding bead thereby prohibiting the creation of hardening structures, such as, for example, ledeburite in the welding zone. The method is especially suitable for flash butt welding workpieces having wall thicknesses of over 12 mm.

3 Claims, 2 Drawing Sheets

METHOD OF FLASH BUTT WELDING HIGH-CARBON MATERIAL, IN PARTICULAR NODULAR CAST IRON

BACKGROUND OF THE INVENTION

The present invention relates to a method of flash butt welding high-carbon materials and, more particularly, a method of flash butt welding modular cast iron.

In known flash butt welding methods such as that in accordance with current and force are transmitted to the parts to be joined by clamping jaws. The parts to be joined, through which DIN 1910, current flows, are heated under light contact by the formation of arcing contacts and molten material is thrown out of the end-face area by metal vapor pressure. After sufficient heating, the workpieces are welded by sudden upsetting.

The weldability of high-carbon materials, in particular materials where the carbon ranges between 2.0 to 3.9% by weight, although known for a long time, are still problematic. The reason for this lies in the hardening behavior of these materials and a tendency associated therewith to form ledeburitic and/or martensitic hardening structures which considerably restrict the constructional weldability of these material groups.

German Offenlegungsschrift DE 3628246 A1, assigned to the assignee of the instant invention, discloses a method of butt welding high carbon materials by a post weld control temperature method so as to control the formation of ledeburitic and/or martensitic structures, while satisfactory welds can be obtained in relatively thin-walled workpieces, thick-walled workpieces, i.e., at wall thicknesses over 12 mm, satisfactory welded structures cannot be guaranteed, since the entire proportion of molten metal is not forced out of the interface during the upsetting operation. If the entire crater lies inside the wall thickness, the escape routes are closed during the upsetting. In thick-walled workpieces, therefore, ledeburitic, lenticular inclusions in the welding zone can generally be expected.

The inclusions arise from the sequence mechanism of the known welding operation in the following manner.

The current-carrying parts which are to be joined are moved against one another with a certain contact force and pulled apart again. When the parts to be joined are carrying current, the current is switched on and off by the parts to be joined themselves, and in the process considerable heating occurs at the contact points. This preheating cycle is repeated several times until the abutting ends have been heated in such a way that the energy supplied is sufficient to initiate the flashing process.

So-called arcing contacts occur at the locations where the heated contact points touch. In these contact areas, a very high energy density is partly introduced into the material so that rapid melting of the metal takes place at these points. However, the molten metal is not distributed homogenously over the entire contact face but collects in arcing craters created by the heated contacts. The deeper and larger these arcing craters are, the more difficult it becomes to press these liquid metal areas from the craters into the welding bead during the subsequent upsetting operation. Although a portion of this liquid metal is thrown out of the welding gap from the arcing craters as a result of the high metal vapor pressure, a considerable proportion of molten metal remains behind in the deepest points of the arcing craters, from where it can no longer be conveyed out of the welding zone by the upsetting pressure.

Accordingly, it is the principle object of the present invention to provide an improved butt-welding method for welding thick-walled, high carbon workpieces so as to produce a defect-free welded point.

SUMMARY OF THE INVENTION

The foregoing object is achieved by way of the present invention wherein a method for butt-welding is provided which comprises forming arcing craters on the contact faces of the parts to be joined such that the maximum depth (D max) of any crater is less than or equal to the thickness of the plasticized zone created during arcing contact of the contact faces of the parts to be joined thereby allowing all molten metal on the contact faces to be pressed out into a weld bead thereby preventing the formation of ledeburite and/or martensitic inclusions. In accordance with the preferred method of the present invention, the maximum depth of the craters formed is less than or equal to 170 $\mu$m.

The method according to the present invention is based on the knowledge that the disadvantages found heretofore in joining thick-walled workpieces can in particular be attributed to the fact that the molten material areas on the contact faces are not displaced out of the contact-face area. In other words, a considerable proportion of molten metal is left behind which cannot be pressed into the welding bead by the upsetting operation. Ledeburite is a hardening structure and is the eutectic of the metastable Fe-C-system and, in the cold state, i.e., below 723° C., the transformation point of the austenite into pearlite, consists of a fine mixture of cementite and pearlite. If ledeburitic lentils or inclusions are left behind in the welding zone due to the molten metal, they form weak points.

BRIEF DESCRIPTION OF THE DRAWINGS

The invention is described in greater detail with reference to the figures.

DETAILED DESCRIPTION

Figure 1:
FIGS. 1 and 2 show a plan view of one contact face of each part to be joined.

The contact face shown in FIG. 1 has craters 1 which are irregularly distributed in the contact face. These craters, just before the upsetting operation, are filled with molten metal which develops as a result of the arcing contacts.

Since the distribution of the arcing craters recognizably turns out to be irregular, it is obvious that an irregular plasticized zone adjoins the surface.

Since the upsetting displacement cannot be longer than the thickness of the plasticized zone, a very irregular force distribution occurs during the upsetting operation.

It turns out that, in areas having craters formed to a smaller depth, the upsetting operation is already complete, while in the adjoining area 3, featuring craters formed of a greater depth, the upsetting operation is in full progress. This makes it substantially more difficult for the molten material to escape from the deeper craters.

Figure 2:

FIG. 2 shows a contact face formed according to the invention. The craters 2 are distributed relatively homogenously along the entire surface. The depths of the individual craters, by controlled feeding of energy during the intermitting contact phase of the contact faces, is formed in such a way that the craters lie within the narrowest thicknesses of the plasticized zone. In other words, the plasticized zone adjoining the contact face is roughly more or less continuously running area whose width does not substantially vary.

The upsetting pressure during the upsetting operation acts uniformly over the entire contact face, since the upsetting displacement along the entire contact face is essentially the same.

By this homogenous distribution of small craters, it is possible to press all the molten material areas into the welding bead during the upsetting operation. This prevents solidification structures, such as, for example, ledeburite, from being left behind in the welding zone.

Figure 3:
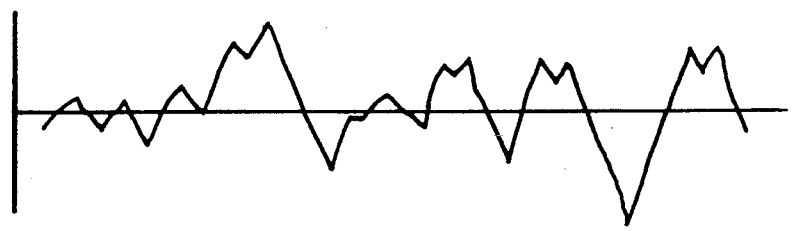
FIGS. 3 and 4 show the corresponding roughness profiles of the part of FIGS. 1 and 2 respectively.
Figure 4:
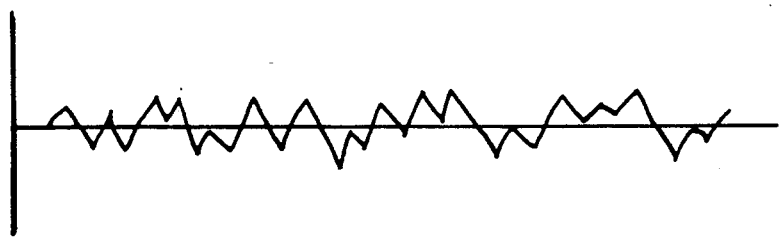

FIGS. 3 and 4 illustrate the different crater configurations in FIGS. 1 and 2. In the preferred method of the present invention, the craters are formed such that the maximum depth of the craters is less than or equal to 170 $\mu$m and preferably between 60 and 170 $\mu$m.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for flash butt welding high-carbon materials wherein current is passed intermittently through the contact faces of the parts to be joined whereby the contact faces are heated by the formation of arcing contacts on the contact faces thereby producing arcing craters containing molten metal adjoining a zone of plasticized material, said method comprising forming said arcing craters on the contact faces of the parts to be joined such that the maximum depth of any crater is less than or equal to the minimum thickness of the plasticized zone and thereafter applying an upsetting pressure to join the contact faces of said parts such that the molten metal areas are pressed out of the contact face areas into a weld bead thereby preventing the formation of ledeburitic and/or martensitic inclusions.

2. A method according to claim 1 wherein the maximum depth of any one crater is less than or equal to 170 $\mu$m.

3. A method according to claim 1 wherein the depth of any one crater is between 60 and 170 $\mu$m.

* * * * *